(12) United States Patent
Ishikawa

(10) Patent No.: US 6,186,022 B1
(45) Date of Patent: Feb. 13, 2001

(54) TURN SIGNAL CANCELLATION MECHANISM

(75) Inventor: Masaru Ishikawa, Niwa-gun (JP)

(73) Assignee: Kabushiki Kaisha Tokai Rika Denki, Niwa-gun (JP)

( * ) Notice: Under 35 U.S.C. 154(b), the term of this patent shall be extended for 0 days.

(21) Appl. No.: 09/341,863

(22) PCT Filed: Jan. 19, 1998

(86) PCT No.: PCT/JP98/00173

§ 371 Date: Jul. 20, 1999

§ 102(e) Date: Jul. 20, 1999

(87) PCT Pub. No.: WO98/31564

PCT Pub. Date: Jul. 23, 1998

(30) Foreign Application Priority Data

Jan. 20, 1997 (JP) .................................................. 9-022007

(51) Int. Cl.$^7$ .................................................. G05G 13/00
(52) U.S. Cl. ....................................... 74/484 R; 200/61.3
(58) Field of Search ............ 74/484 R; 200/61.27–61.38

(56) References Cited

FOREIGN PATENT DOCUMENTS

| | | |
|---|---|---|
| 56-84437 | 7/1981 | (JP) . |
| 62-137243 | 6/1987 | (JP) . |
| 62-202714 | 12/1987 | (JP) . |
| 63-159344 | 10/1988 | (JP) . |
| 3-68139 | 7/1991 | (JP) . |
| 6-127305 | 5/1994 | (JP) . |
| 6-42411 | 6/1994 | (JP) . |

*Primary Examiner*—Lenard A. Footland
(74) *Attorney, Agent, or Firm*—Morgan, Lewis & Bockius LLP

(57) ABSTRACT

There is provided a turn signal canceling mechanism 30 in which the types of the springs 42, 49 can be reduced and the production cost can be lowered.

A turn signal canceling mechanism comprises: a canceling cam 31; a turn bracket 35 attached to a case 34 so that the turn bracket can be turned between a neutral position and a right or a left turning position being linked with the operation of a turn signal lever 32; a movable member 38 having a pair of arms 37 arranged on the right and left, the movable member being attached to the turn bracket 35 in such a manner that the movable member can proceed and retract, the movable member being biased by a moderation spring 42 so that a moderation mechanism can be composed in which a forward end portion of each arm 37 comes into pressure contact with a moderation ridge 43 and the turn bracket 35 is held at one of the neutral position, right turning position and left turning position; and a ratchet 39 biased by a ratchet spring 49 in a direction so that the ratchet can proceed to the canceling cam 31, wherein when the turn bracket 35 is in a locking condition, the movable member 38 is retracted while resisting a force generated by the moderation spring 42, so that a disengagement of the ratchet 39 is caused.

2 Claims, 4 Drawing Sheets

TURN SIGNAL CANCELLATION MECHANISM

FIELD OF THE INVENTION

The present invention relates to a turn signal canceling mechanism for automatically returning a turn signal lever, which has been turned from a neutral position to a right or a left position so that a proceeding direction of a vehicle can be indicated, to the neutral position when a steering shaft is turned in a direction opposite to the direction of the turn signal lever.

TECHNICAL BACKGROUND OF THE INVENTION

In FIG. 5, there is shown a conventional turn signal canceling mechanism. As shown in the drawing, the turn signal canceling mechanism 10 includes: a canceling cam 11 turned integrally with a steering shaft; a turn bracket 14 attached to a case 13 so that the turn bracket 14 can be turned from a neutral position to a right or a left turning position being linked with a turn signal lever 12; a back plate 16 having a pair of arms 15 which are arranged on the right and left; and a ratchet 17 attached to the case 13 so that the ratchet 17 can be advanced and retracted.

Moderation pieces 18 and moderation springs 19 are respectively incorporated into the right and the left end portions of the turn bracket 14. These moderation pieces 18 come into pressure contact with moderation ridges 20 arranged in the case 13. Therefore, the turn bracket 14 can be held at the neutral position, the right turning position or the left turning position by these moderation pieces 18 and the moderation springs 19. On an upper face of the turn bracket 14, there are provided a pair of protrusions 21 which are arranged on the right and left, and the back plate 16 is attached to both protrusions 21 in such a manner that the back plate 16 can be linearly reciprocated. The back plate 16 is held at a neutral position by the back spring 22 arranged between both protrusions 21.

The ratchet 17 has a protrusion 23 formed on the upper face, a protrusion 24 formed on the lower face, and a step portion 25. The upper protrusion 23 is engaged with a long groove 26 formed on an upper cover of the case, and the lower protrusion 24 slidably comes into contact with a cam face 27, the profile of which is an angle-shape, arranged inside of the forward end of the turn bracket 14. There is provided a ratchet spring 28 in the step portion 25 on the lower face. This ratchet spring 28 biases the ratchet 17 toward the canceling cam 11.

The structure of the conventional turn signal canceling mechanism 10 is described above. As shown in FIG. 5, when the turn bracket 14 is located at the neutral position, the lower protrusion 24 slidably comes into contact with a top portion of the ridge of the cam face 27, and a forward end portion of the ratchet 17 retracts from a rotational locus of the canceling cam 11.

When the turn lever 12 is operated, the turn bracket 14 is turned to the right turning position or the left turning position and held at the position by the actions of the moderation ridge 20, moderation piece 18 and moderation spring 19. When the turn bracket 14 is turned, the lower protrusion 24, which slidably comes into contact with the top of the ridge of the cam face 27, slidably comes into contact with a bottom portion. Therefore, the ratchet 17 advances along the long groove 26, and the forward end portion proceeds into the rotational locus of the canceling cam 11, and a base end portion of the ratchet 17 comes close to one of the arms 15.

When the turn bracket 14 is located at the right or the left turning position and also when the canceling cam 11 is turned in the same direction as that of the steering shaft according to the turn of the steering shaft, the canceling cam 11 is engaged with a forward end of the ratchet 17, and the base end portion of the ratchet 17 is turned in a direction so that it can be separate from the arm 15 which has been located close to the base end portion of the ratchet 17. On the other hand, when the canceling cam 11 is turned in the opposite direction, the base end portion of the ratchet 17 is engaged with the arm 15 which is located close to it. Therefore, the turn bracket 14 is returned to the neutral position integrally with the back plate 16.

When the turn signal lever 12 is turned by an operator's hand and held at the position as it is, the turn bracket 14 integrated with the lever 12 is locked at the right turning position or the left turning position. When the canceling cam 11 is turned in the opposite direction under the condition that the turn bracket 14 is locked at the right turning position or the left turning position, the base end portion of the ratchet 17 is engaged with the arm 15 which is located close to it, and a torque of the canceling cam 11 is transmitted to the back plate 16. Therefore, the back spring 22 is compressed, and the back plate 16 is moved to the right or the left along the protrusion 21, so that a disengagement of the ratchet 17 is caused.

In this connection, in the above conventional turn signal canceling mechanism 10, it is necessary to provide three types of springs including the moderation spring 19, the back spring 22 and the ratchet spring 28. As a result, the number of parts is large, and the production cost is raised.

The present invention has been accomplished to solve the above problems. It is an object of the present invention to provide a turn signal canceling mechanism capable of lowering the cost by reducing the number of spring types.

SUMMARY OF THE INVENTION

The present invention provides a turn signal canceling mechanism comprising: a canceling cam turned integrally with a steering shaft; a turn bracket attached to a case so that the turn bracket can be turned between a neutral position and a right or a left turning position being linked with the operation of a turn signal lever; a movable member having a pair of arms arranged on the right and left, the movable member being attached to the turn bracket in such a manner that the movable member can proceed and retract, the movable member being biased by a moderation spring so that a moderation mechanism can be composed in which a forward end portion of each arm comes into pressure contact with a moderation ridge formed in the case and the turn bracket is held at one of the neutral position, right turning position and left turning position; and a ratchet attached to the case in such a manner that the ratchet can proceed, retract and turn, the ratchet being biased by a ratchet spring in a direction so that the ratchet can proceed into a rotational locus of the canceling cam, wherein a forward end portion of the ratchet proceeds into the rotational locus of the canceling cam when the turn bracket is turned from the neutral position to the right or the left turning position, a base end portion of the ratchet is turned between both arms when the turn bracket is located at the right turning position or the left turning position and the canceling cam is turned in the same direction, the base end portion of the ratchet is engaged with one of the arms and the turn bracket is returned to the neutral position when the canceling cam is turned to the opposite direction, and the turn bracket, ratchet and movable member are linked with each other so that the base end portion of the ratchet can be engaged with one of the arms and the movable member can be retracted while resisting a biasing force of the moderation spring when the turn bracket is locked at the right turning position or the left turning position and the canceling cam is turned in the opposite direction.

According to the invention, the movable member is retracted while resisting a force generated by the moderation spring. Due to the foregoing, a clearance is caused in the ratchet under the condition that the turn bracket is locked. Therefore, compared with the structure of the conventional turn signal canceling mechanism having two moderation spring, two moderation pieces, a back spring and a back plate, the turn signal canceling mechanism of the present invention can be composed of a moderation spring and a single movable member. Therefore, the production cost can be lowered.

The present invention provides a turn signal canceling mechanism according to claim 1, wherein the moderation spring is arranged at an intermediate position between both arms.

According to the invention, the moderation spring is arranged at the intermediate position between both arms. Therefore, it is possible to provide a disengagement of the ratchet by utilizing compression of one moderation spring. Accordingly, the production cost can be more reduced.

THE MOST PREFERRED EMBODIMENT

Figure 1:
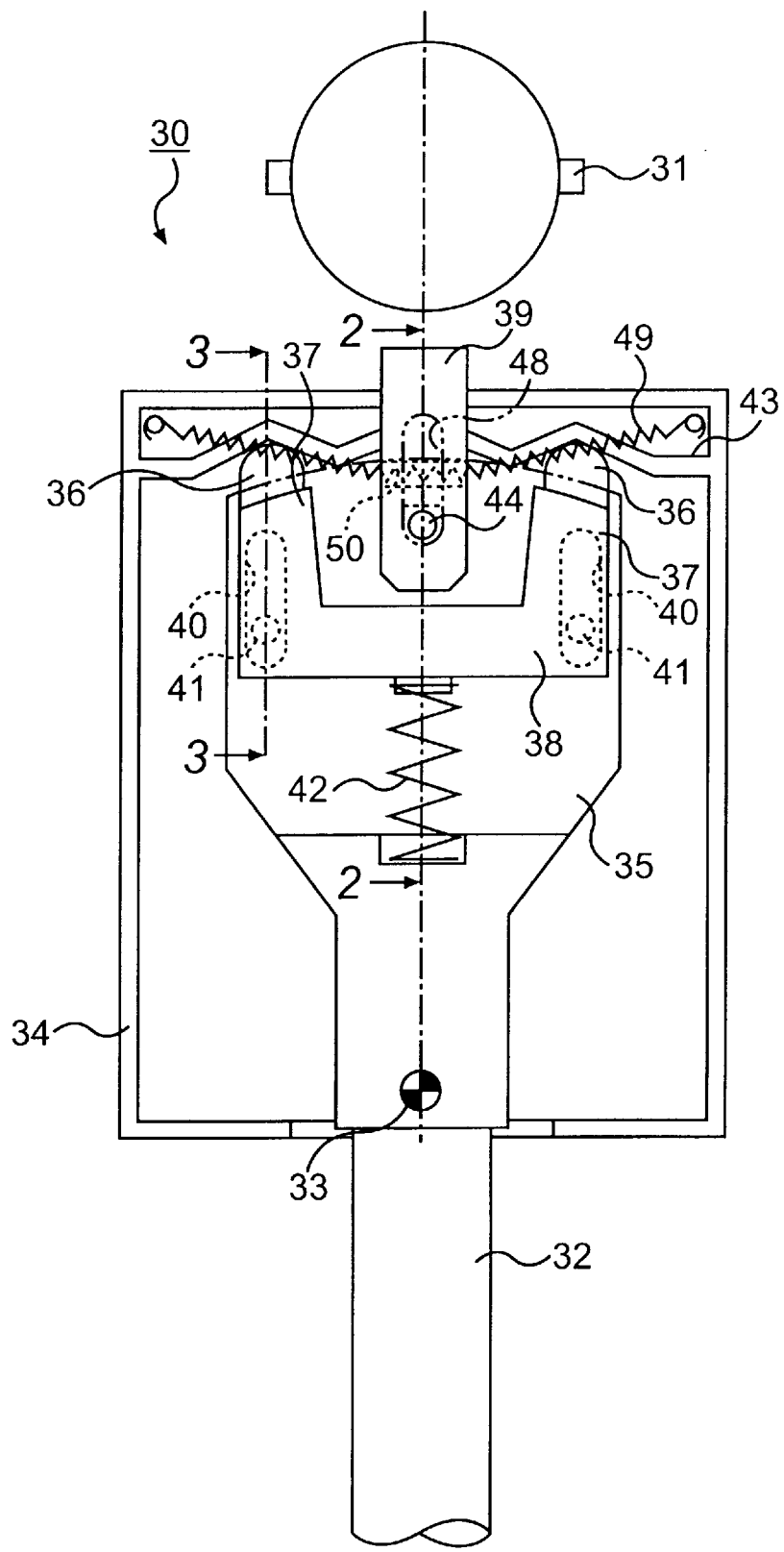
FIG. 1 is a plan view showing a turn signal canceling mechanism of an embodiment of the present invention.

Referring to the appended drawings, the present invention will be explained as follows. FIGS. 1 to 4 are views showing a turn signal canceling mechanism 30 which is an embodiment of the present invention. The turn signal canceling mechanism 30 concerned includes: a canceling cam 31 turned integrally with a steering shaft; a turn bracket 35 attached to a case 34 by a shaft 33 so that the turn bracket 35 can be turned being linked with a turn signal lever 32; a substantially C-shaped movable member 38 having a pair of arms 37, which are arranged on the right and left, at the forward end portions of which semicircular moderation pieces 36 are attached integrally with the arms 37; and a ratchet 39.

Figure 3:
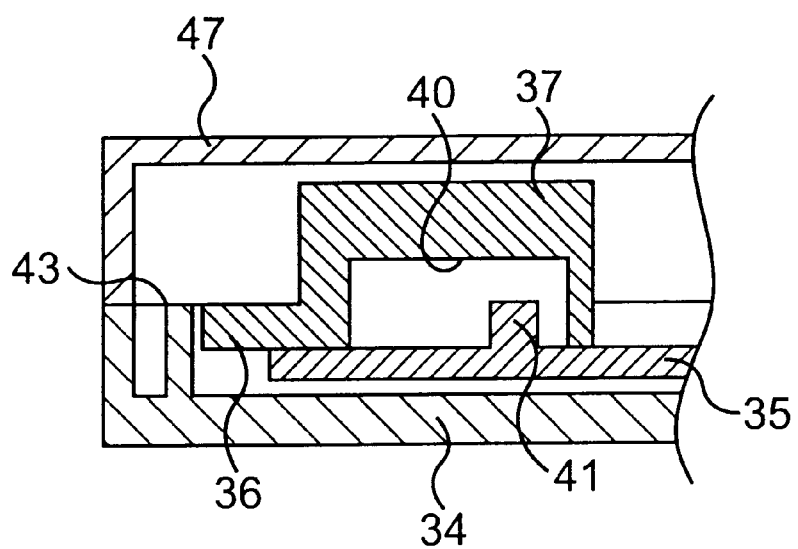
FIG. 3 is a cross-sectional view taken on line 3—3 in FIG. 2.

Inner end faces of the arms 37 of the movable member 38 are tapered in such a manner that an interval between both arms 37 is extended when it comes to forward ends of the arms 37. As the detail is shown in FIG. 3, a pin 41 protruded from the turn bracket 35 is slidably engaged in a long hole 40 formed on a reverse side of each arm 37. Due to the foregoing, the movable member 38 is incorporated into the turn bracket 35 in such a manner that the movable member 38 can proceed to and retract from the turn bracket 35. There is provided a moderation spring 42 between the intermediate portion of both arms 37 of the movable member 38 and the turn bracket 35. By the action of this moderation spring 42, the moderation piece 36 of each arm 37 comes into pressure contact with a moderation ridge 43 formed in the case 34. Therefore, the turn bracket 35 can be held at the neutral position shown in FIG. 1. Also, the turn bracket 35 can be held at the right turning position or left turning position shown in FIG. 4.

Figure 2:
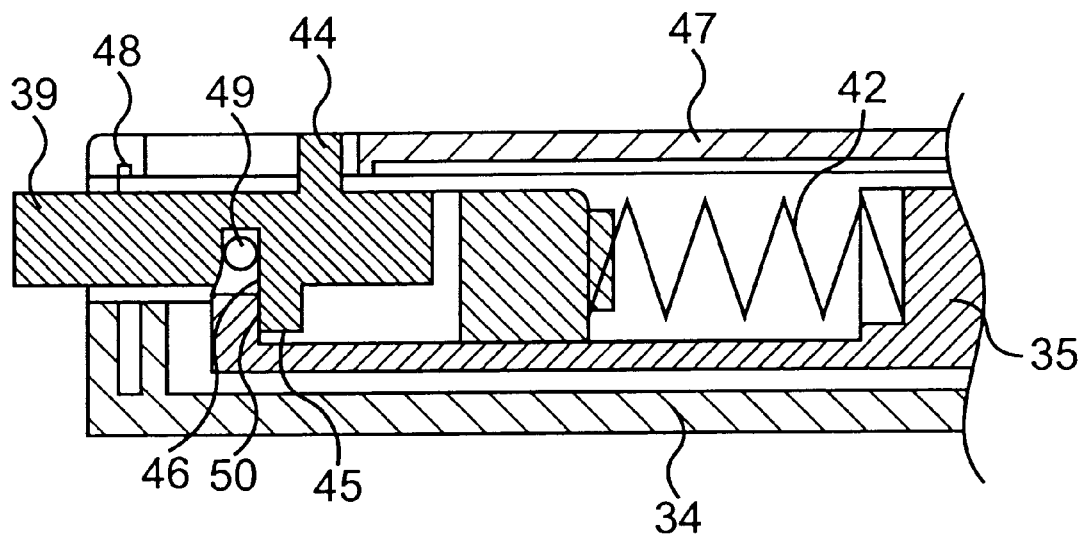
FIG. 2 is a cross-sectional view taken on line 2—2 in FIG. 1.

As shown in FIG. 2, in the ratchet 39, there are provided an upper protrusion 44 and a lower protrusion 45. On the lower face of the ratchet 39, there is provided a recess 46. When the upper protrusion 44 is slidably engaged with a long hole 48 formed on an upper cover 47 of the case, the ratchet 39 is attached in such a manner that it can proceed, retract and turn. When an intermediate portion of the ratchet spring 49, both ends of which are hooked at the case 34, is engaged with the recess 46, the ratchet 39 is biased by the action of the ratchet spring 49 toward the canceling cam 31. On the other hand, the lower protrusion 45 of the ratchet 39 slidably comes into contact with an angle-shaped cam face 50 formed at the center of the forward end portion of the turn bracket 35.

When the turn bracket 35 is located at the neutral position shown in FIG. 1, the lower protrusion 45 comes into contact with a top portion of the angle-shaped cam face 50, and a forward end portion of the ratchet 39 is retracted from the rotational locus of the canceling cam 31. On the other hand, when the turn bracket 35 is turned to the right turning position or the left turning position, the lower protrusion 45 slidably comes into contact with a bottom portion of the angle-shaped cam face 50, and the forward end portion of the ratchet 39 proceeds into the rotational locus of the canceling cam 31.

The structure of the turn signal canceling mechanism 30 of the present embodiment is described above. Next, operation of the turn signal canceling mechanism 30 will be explained below.

When the turn bracket 35 is located at the neutral position and the forward end portion of the ratchet 39 is retracted from the rotational locus of the canceling cam 31 as shown in FIG. 1, even if the canceling cam 31 is turned integrally with the steering shaft, the canceling cam 31 does not engage with the ratchet.

Figure 4:
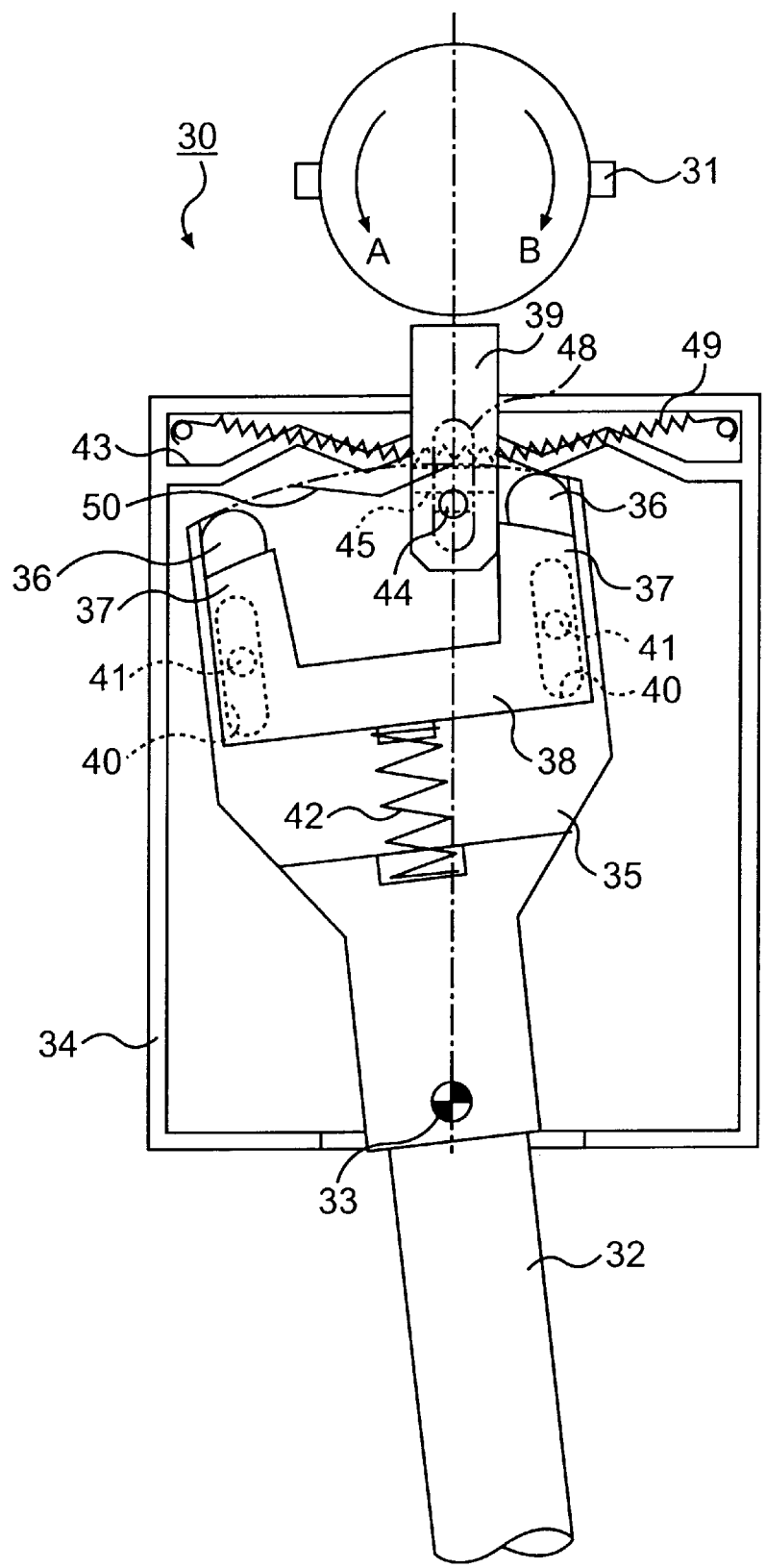
FIG. 4 is a plan view for explaining operation of the turn signal canceling mechanism.
Figure 5:
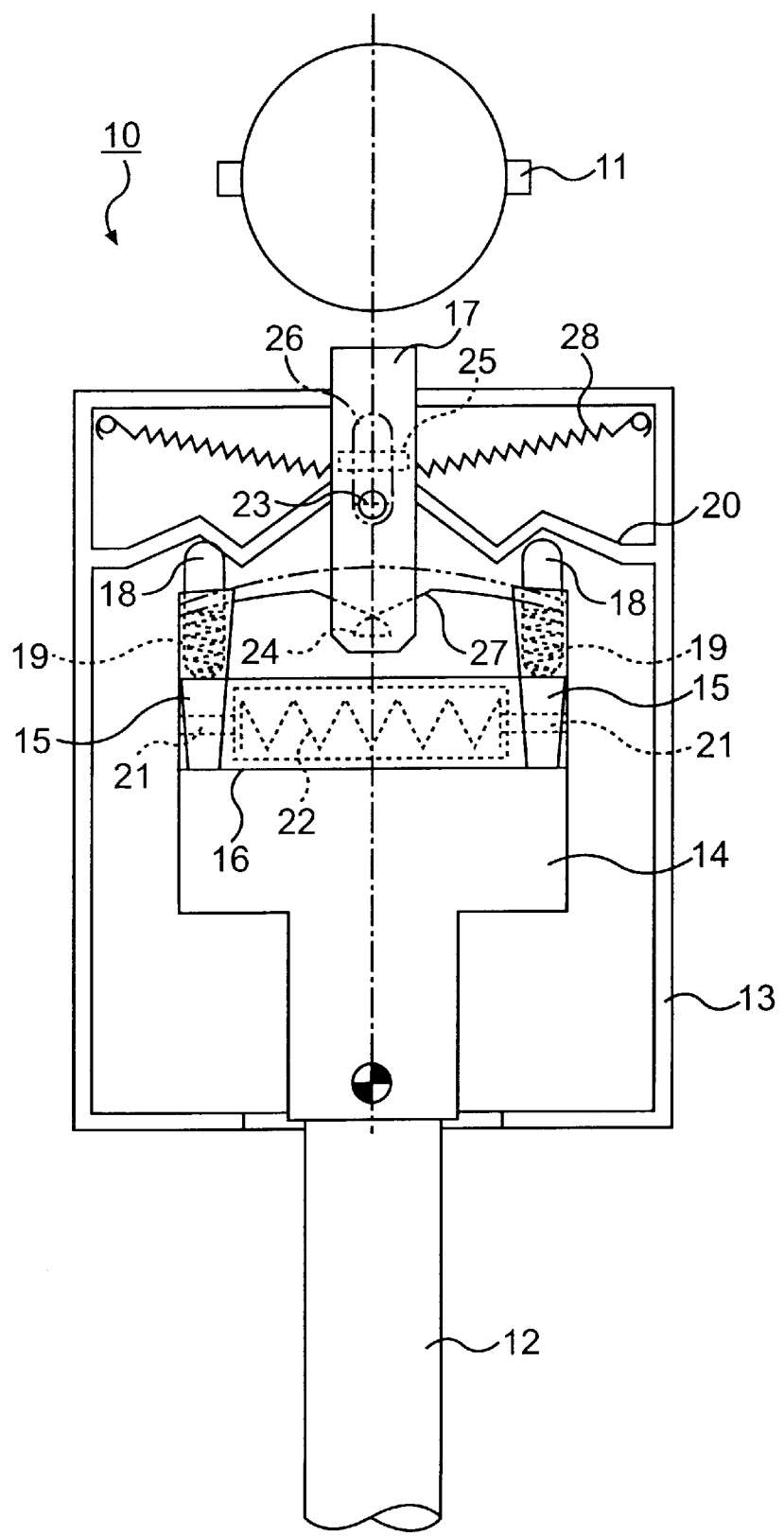
FIG. 5 is a plan view showing a conventional turn signal canceling mechanism.

When the turn signal lever 32 is operated and the turn bracket 35 is turned to the right turning position shown in FIG. 4, the moderation pieces 36 arranged at the forward ends of the arms 37 come into pressure contact with the moderation ridges 43 by the action of the moderation spring 42. The moderation pieces 36 are held at the positions. When the turn bracket is turned, the lower protrusion 45 slidably coming into contact with the top of the ridge of the cam face 50 slidably comes into contact with the bottom portion. Therefore, the ratchet 39 proceeds by a force of the ratchet spring 49, and the forward end portion of the ratchet 39 enters the rotational locus of the canceling cam 31, and at the same time the base end portion of the ratchet 39 comes close to the inner end face of one of the arms 37 of the movable member 38.

When the turn bracket 35 is located at the right turning position and also when the steering shaft is turned and the canceling cam 31 is turned in the same direction (shown by arrow A in FIG. 4), the canceling cam 31 is engaged with the forward end of the ratchet 39, and the base end portion of the ratchet 39 is turned in a direction so that the base end portion can be separate from the arm 37 which has been located close to the base end portion. On the other hand, when the canceling cam 31 is turned in the opposite direction (shown by arrow B in FIG. 4), the base end portion of the ratchet 39 is engaged with the arm 37 which has been located close to the base end portion, and the movable member 38 is pushed by the base end portion, so that the turn bracket 35 is returned to the neutral position together with the movable member 38.

When an operator operates the turn signal lever 32 and holds it without letting go his hold, the turn bracket 35 integrated with the lever 32 is locked at the right turning position. When the canceling cam 31 is turned in the opposite direction (shown by arrow B in FIG. 4) under the above condition, the base end portion of the ratchet 39 is engaged with the arm 37 which is located close to the base end portion, and the movable member 38 is pushed by the base end portion. However, since the turn bracket 35 is locked, the moderation spring 42 is compressed, and the movable member 38 is retracted being guided by the long hole 40 and the pin 41. Therefore, a disengagement of the ratchet 39 is caused.

In this connection, when the turn signal lever 32 is turned to the left turning position, operation is the same as that of the case in which the turn signal lever 32 is turned to the right turning position. Therefore, the explanation is omitted here.

According to the turn signal canceling mechanism 30 of this embodiment, when the movable member 38 is retracted while resisting a force generated by the moderation spring 42. Due to the foregoing, a disengagement of the ratchet 39 is caused in the locking condition of the turn bracket 35. Accordingly, it is possible to omit the back spring 22 which is required for the conventional turn signal canceling mechanism 10, and further the number of the moderation springs c an be reduced to one. Since the type and number of the springs can be reduced as described above, the production cost can be lowered.

In this connection, in the turn signal canceling mechanism 30 of the aforementioned embodiment, one moderation spring 42 is attached between both arms 37 of the movable member 38. However, two moderation springs may be arranged corresponding to the arms 37. The reason is that the number of types of the moderation springs can be reduced, and the production cost can be lowered.

What is claimed is:

1. A turn signal canceling mechanism comprising:

a canceling cam turned integrally with a steering shaft;

a turn bracket attached to a case so that the turn bracket can be turned between a neutral position and a right or a left turning position being linked with the operation of a turn signal lever;

a movable member having a pair of arms arranged on the right and left, the movable member being attached to the turn bracket in such a manner that the movable member can proceed and retract, the movable member being biased by a moderation spring so that a moderation mechanism can be composed in which a forward end portion of each arm comes into pressure contact with a moderation ridge formed in the case and the turn bracket is held at one of the neutral position, right turning position and left turning position; and a ratchet attached to the case in such a manner that the ratchet can proceed, retract and turn, the ratchet being biased by a ratchet spring in a direction so that the ratchet can proceed into a rotational locus of the canceling cam, wherein a forward end portion of the ratchet proceeds into the rotational locus of the canceling cam when the turn bracket is turned from the neutral position to the right or the left turning position, a base end portion of the ratchet is turned between both arms when the turn bracket is located at the right turning position or the left turning position and the canceling cam is turned in the same direction, the base end portion of the ratchet is engaged with one of the arms and the turn bracket is returned to the neutral position when the canceling cam is turned to the opposite direction, and the turn bracket, ratchet and movable member are linked with each other so that the base end portion of the ratchet can be engaged with one of the arms and the movable member can be retracted while resisting a biasing force of the moderation spring when the turn bracket is locked at the right turning position or the left turning position and the canceling cam is turned in the opposite direction.

2. A turn signal canceling mechanism according to claim 1, wherein the moderation spring is arranged at an intermediate position between both arms.

\* \* \* \* \*